United States Patent Office 2,746,957
Patented May 22, 1956

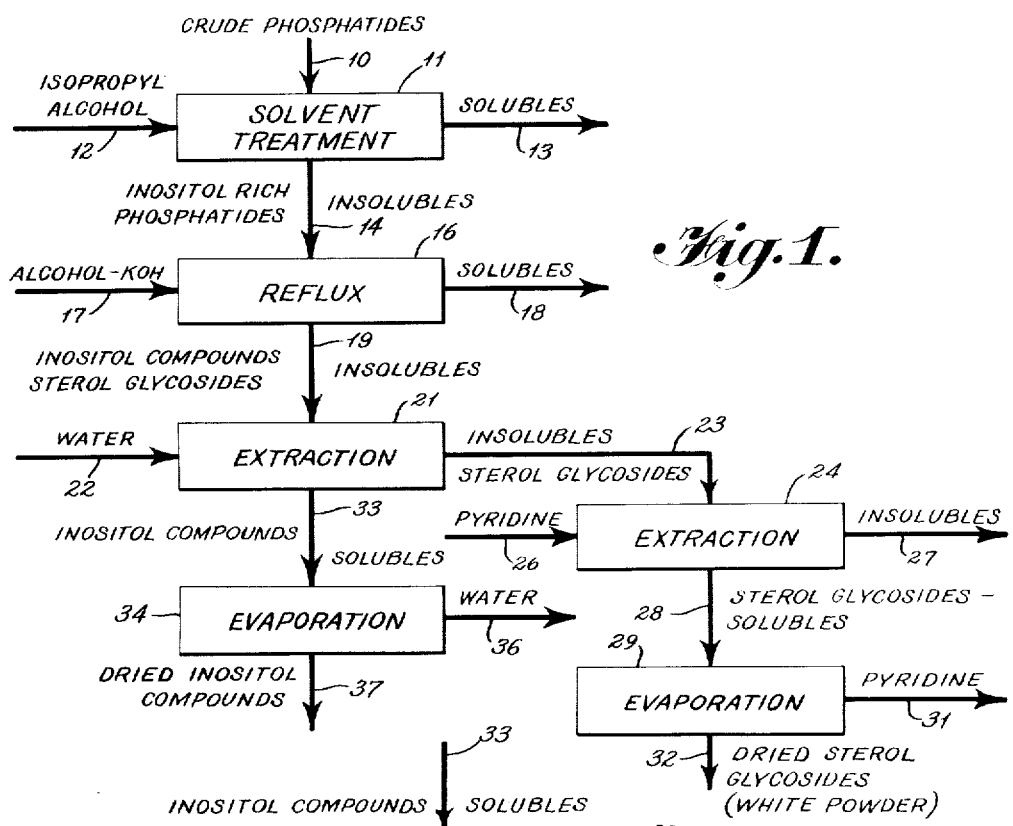
*Fig. 1.*
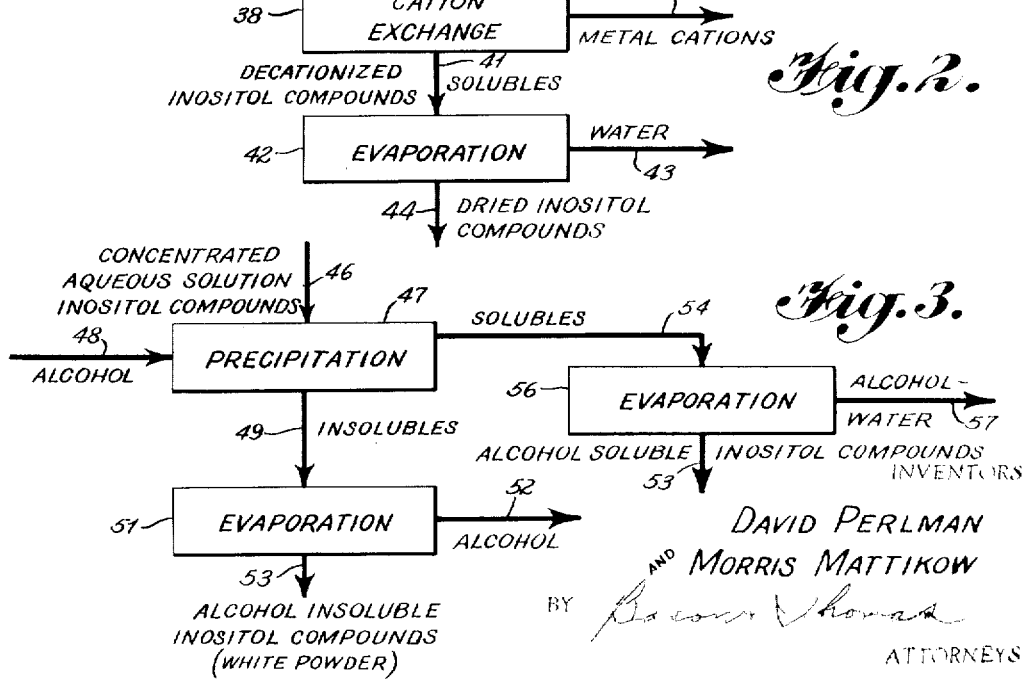
*Fig. 2.*
*Fig. 3.*
INVENTORS
DAVID PERLMAN
AND MORRIS MATTIKOW
BY
ATTORNEYS

2,746,957

RECOVERY OF WATER SOLUBLE INOSITOL COMPOUNDS AND STEROL GLYCOSIDES

David Perlman and Morris Mattikow, New York, N. Y., assignors to Benjamin Clayton, doing business under the fictitious name and style of Refining, Unincorporated Application September 23, 1952, Serial No. 310,947

8 Claims. (Cl. 260—210.5)

This invention relates to the recovery of water-soluble inositol compounds and sterol glycosides and, more particularly, to the recovery of these materials from phosphatidic materials obtained from vegetable oils.

Crude vegetable oils, such as cottonseed oil, corn oil, soyabean oil, peanut oil, linseed oil, rape seed oil, etc., usually contain substantial amounts of phosphatidic material. That is true regardless of whether the oil is recovered from the oil seeds by pressing operations or solvent extraction operations. Such phosphatidic material can be recovered from the crude oil by adding a small amount of water to the oil to precipitate the phosphatidic material therein and then continuously centrifugally separating the precipitated material from the oil. This process is carried out commercially on a large scale for recovering phosphatidic materials from corn oil and soyabean oil as part of the refining procedure for such oils. The recovered phosphatidic materials are dried by evaporation of water under vacuum and at moderate temperatures. The dried phosphatidic materials are sold commercially and contain an amount of the original oil ranging between approximately 30 and 40% of the crude phosphatides.

The phosphatidic materials recovered from soyabean oil and corn oil are largely used in edible products and are relatively inexpensive since they are by-products and the amount which can be recovered considerably exceeds the demand. Phosphatidic materials from certain other edible oils, such as peanut oil, are suitable for the same purposes but, so far as Applicants are aware, they are not produced commercially. The phosphatidic material from cottonseed oil is, in general, not suitable for edible purposes as it contains a difficultly removable toxic material, gossypol, and such material as well as the phosphatidic materials from most other edible vegetable oils and from non-edible vegetable oils, such as those employed in paints, are discarded as waste materials from the oils in the various refining procedures employed thereon.

The phosphatidic materials which can be recovered from cottonseed oil and the non-edible oils, such as linseed oil, as well as the phosphatidic materials which can be recovered from other edible oils are suitable for employment in the present invention. That is to say, phosphatidic materials obtained from any of the vegetable oils constitute an excellent source for the recovery of water-soluble inositol compounds and sterol glycosides. Such phosphatidic materials will usually contain between approximately 4 and 10% of sterol glycosides and between approximately 2 and 6% water-soluble inositol compounds based on the weight of the oil-free phosphatidic material. The sterol glycosides and inositol compounds are apparently present in the phosphatidic material as part of complex compounds with the phosphatides, since breaking up of the phosphatidic molecules appears to be necessary for the separation of the sterol glycosides and inositol compounds from the phosphatidic material.

As disclosed in our copending application Serial No. 192,232, filed October 26, 1950, high yields of sterol glycosides in substantially pure form can be recovered from vegetable oil phosphatidic material by an alkaline process in which the materials being treated are at all times maintained either alkaline or substantially neutral such that elaborate and expensive apparatus resistant to corrosion by acids is not required. Also, in accordance with said copending application, high yields of substantially pure inositol can be recovered by an acid-splitting step of the residue resulting from pyridine extraction of the sterol glycosides in the alkaline process. In accordance with the present invention, an improved process is provided which has the same advantages but in addition is a simpler process producing water-soluble inositol compounds and substantially pure sterol glycosides.

The initial step in the alkaline process of said copending application liberates both water-soluble inositol compounds and sterol glycosides. In accordance with said copending application, the sterol glycosides were first extracted from the reaction products of the initial step and the residue subjected to the acid-splitting step to liberate inositol. No acid-splitting step is employed in the present invention, but water-soluble inositol compounds are recovered. These compounds are organo-phosphoric acid-inositol-carbohydrate-nitrogen complexes, the exact natures of which have not been determined. Such complexes have important uses but, if desired, may be subjected to an acid-splitting operation to recover purified inositol.

The starting material for the present process may be the crude phosphatidic material referred to above after such material has been dried to remove substantially all water. It is more advantageous, however, to employ a starting material from which at least the carrier oil has been removed by solvent treatment, i. e., with a solvent such as acetone, which will dissolve the carrier oil but not the phosphatides. An even better and preferred starting material is, however, a vegetable oil phosphatidic material from which not only the carrier oil but also the alcohol-soluble phosphatidic material has been removed. That is to say, it has been found that the inositol-containing phosphatide complexes are less soluble in lower aliphatic alcohols than the non-inositol-containing phosphatidic material, and removal of the carrier oil and alcohol-soluble phosphatidic material produces a starting material much richer in inositol than are the crude phosphatidic materials.

It is therefore an object of the present invention to provide a process of recovering water-soluble inositol compounds from vegetable oil phosphatidic material.

Another object of the invention is to provide a process of recovering water-soluble inositol compounds and also sterol glycosides from vegetable phosphatidic material.

Other objects and advantages of the invention will appear in the following detailed description of the process made with reference to the attached drawings, of which:

Fig. 1 is a flow sheet illustrating the recovery of water-soluble inositol compounds and sterol glycosides from crude phosphatides;

Fig. 2 is a flow sheet illustrating further purification steps for the water-soluble inositol compounds; and Fig. 3 is a flow sheet illustrating fractionation of the water-soluble inositol compounds.

Referring to Fig. 1, crude vegetable oil phosphatides may be introduced, as indicated by an arrow 10, into a solvent treatment step 11. The crude vegetable oil phosphatides should be dried, i. e., should be substantially free of water, and will usually contain between 30 and 40% carrier glyceride oil, the remainder being phosphatidic material in the form of various phosphatide complexes. The preferred solvent for treating the crude phosphatides is isopropyl alcohol, as indicated by the arrow 12, since isopropyl alcohol is not only a solvent for a portion of the phosphatidic material but is also a solvent for the carrier oil. If isopropyl alcohol is employed as the solvent, the solubles discharged from the solvent treatment step 11, as indicated by the arrow 13, are the carrier oil and the phosphatidic material soluble in isopropyl alcohol. By evaporating the alcohol from such solubles a product entirely suitable for the same uses as the commercial vegetable oil phosphatides is obtained and the alcohol may be reused in the present process. The insolubles discharged from the solvent treatment, as indicated by the arrow 14, are the inositol-rich phosphatides.

Other solvent treatments may be employed to reach substantially the same result. For example, the crude phosphatides may first be treated with acetone. The acetone is a solvent for the carrier oil, but substantially all of the phosphatidic material is insoluble in acetone, in which case the residue of such solvent treatment contains substantially all of the phosphatidic material substantially free of carrier oil. This residue can then be treated with substantially any lower aliphatic alcohol, i.e., methyl or ethyl alcohol and, in fact, any lower aliphatic monohydric alcohol containing not more than five carbon atoms. In general, the phosphatidic material which is rich in inositol is relatively insoluble in such alcohols, and the phosphatides which are substantially free of inositol are soluble in such alcohols. Also, in general, it will be found that approximately 80 to 85% of the phosphatidic material may be removed from the crude phosphatides by lower aliphatic alcohols without loss of substantial amounts of inositol-containing phosphatidic material. Again the solvents such as the acetone and alcohol can be recovered and reused in the process and, if desired, a carrier oil added to the alcohol-soluble phosphatides to provide a product suitable for the uses of commercial vegetable oil phosphatides. In any of the solvent treatments above discussed, the inositol-rich phosphatidic complexes can be concentrated in a 15 to 20% fraction of the total phosphatidic material so as to provide a phosphatidic complex which is very much richer in inositol.

The inositol-rich phosphatides indicated by the arrow 14 may be delivered into a splitting step 16 in which the phosphatides are subjected to reflux conditions with alcoholic caustic alkali. Thus alcohol and potassium hydroxide may be introduced into the splitting step 16 as indicated by the arrow 17 and the resulting mixture refluxed. The amount of alcohol employed may range from approximately 4 to 12 volumes per volume of phosphatidic material introduced into the splitting step 16, and the amount of potassium hydroxide may range from approximately that equivalent to the saponification number of the phosphatidic material to two times the amount of phosphatidic material by weight. The time of reflux may vary, for example, from 4 to 16 hours. The preferred alcohol is methanol and the preferred caustic alkali is potassium hydroxide, but any of the lower monohydric aliphatic alcohols containing not more than five carbon atoms can be employed, and other caustic alkalis such as sodium hydroxide may be substituted for potassium hydroxide. The insoluble material may be separated from the soluble material in the reaction products resulting from the splitting operation by filtering, for example, and the solubles, indicated by the arrow 18, discharged from the process. These solubles contain the majority of alcohol, soaps, excess caustic alkali, glycerine, etc. The insolubles may be discharged from the splitting step 16, as indicated by the arrow 19, and are preferably washed several times with alcohol and the washed precipitate dried.

The washed and dried precipitate which contains sterol glycosides and inositol compounds may be delivered into an extraction step 21. Water may be employed to extract the dried precipitate and may be added to the extraction step, as indicated by the arrow 22. The amount of water is not critical, as the inositol compounds are very soluble in water and the sterol glycosides are substantially insoluble therein. Thus the amount of water may range from 10 to 30 times the amount of dried precipitate by volume. The water is preferably mixed with the dried precipitate under intense agitation and the resulting solution may be separated from the insoluble material in any desired manner, for example, by filtration. The insolubles, indicated by the arrow 23, contain the sterol glycosides and will also usually contain a substantial amount of impurities. These insolubles are preferably washed several times with water and then dried, the water from the washing operations being added to the solution containing the solubles.

Substantially all of the impurities contained in the insolubles may be removed by extracting the sterol glycosides therefrom with a volatile nitrogenous organic base such as pyridine, in which the sterol glycosides are soluble. Thus the dried precipitate may be delivered into an extraction step, indicated at 24, and pyridine may be added, as indicated by the arrow 26. The extraction is preferably carried on at a temperature between 90° and 100° C., employing an amount of pyridine ranging from approximately 4 to 10 times the volume of the material being extracted. The insolubles from this extraction may be separated from the solubles, for example by filtration, and, preferably after being extracted several times with lesser amounts of pyridine, may be discharged from the process, as indicated by the arrow 27. The resulting pyridine solutions of sterol glycosides may be combined and introduced, as indicated by the arrow 28, into an evaporation step 29. The pyridine may be evaporated from the solubles and discharged, as indicated by the arrow 31. This pyridine or other volatile nitrogenous base may be returned to the extraction step 24 for reuse. The residue obtained from the evaporation step 29 is a white powder which is substantially pure sterol glycosides and may be discharged from the process, as indicated by the arrow 32.

The aqueous solution containing the solubles from the water extraction step 21 may be discharged therefrom, as indicated by the arrow 33. This aqueous solution contains the water-soluble inositol compounds and, if no further purification of such compounds is desired, this aqueous solution may be delivered into an evaporation step 34. In the evaporation step 34 water may be evaporated and discharged from the process, as indicated by the arrow 36, and dried water-soluble inositol compounds discharged from the process, as indicated by the arrow 37. This dried material is predominantly made up of water-soluble inositol compounds. That is to say, it is made up largely of alkali metal salts of organo-phosphoric acid-inositol-carbohydrate-nitrogen complexes at least some of which also contain other metallic ions such as calcium and magnesium. These compounds are useful as dietary aids, for example, in cattle foods, and also stimulate the growth of fungi such as employed in the production of anti-biotics, e. g., penicillin, streptomycin and terramycetin. They also form water-soluble metallic compounds with such metals as iron, cobalt and manganese, which may be employed in the fortification of foods, including animal feeds. This water-soluble extract from oil-free corn oil phosphatides will contain approximately 17% inositol and this amount of inositol will be increased up to approximately 22%, if only the alcohol-insoluble fraction of oil-free corn oil phosphatides are employed as the starting material in the splitting step 16. This material contains a relatively small amount of impurities such as inorganic phosphates and glycerophosphates, although the content of such impurities is relatively small if only the alcohol-insoluble phosphatidic material is employed as a starting material. That is to say, the impurities come largely from the alcohol-soluble phosphatidic material.

If further purification of the water-soluble inositol compounds is desired, instead of evaporating the water from the solution of inositol compounds discharged, as indicated by the arrow 33, from the extraction step 21 of Fig. 1, the inositol compounds while still in water solution may be introduced into a cation exchange step 38 shown in Fig. 2. The aqueous solution of inositol compounds still contains cations of such metals as potassium, magnesium and calcium. These cations are believed to be present primarily as part of salts of the inositol compounds. They may be removed by percolating the aqueous solution through a bed of any suitable cation exchange resin in the cation exchange step 38. Resins of this type are well-known in the art and act as solid acids which are insoluble in water but which are permeated by water such that they swell and exchange ions while in contact with water. That is to say, they are essentially synthetic resins, for example, phenol-formaldehyde condensation products containing acid radicals or polystyrine sulfonic acid resins. Condensation is carried on to such an extent that the resulting resins are water-insoluble but still permeable by water. Examples of commercial cation exchange resins suitable for use in the present process are Amberlite 120H and Dowex 50.

A bed of particles of cation exchange resins may be employed in the cation exchange step 38 and upon percolating the water solution containing the inositol compounds through such bed, the cations referred to above replace hydrogen cations in the resin. After exhaustion, the resin may be regenerated by any suitable acid such as hydrochloric acid. This replaces the metal cations with hydrogen cations to render the cation exchange resin reusable in the process, and the metal cations are thereby discharged from the process, as indicated by the arrow 39.

The solution entering the cation exchange step is alkaline, i. e., will have a pH of 10 to 11 and the solution discharged from the cation exchange step is acid, i. e., will usually have a pH of 2 to 3. This solution may be discharged from the cation exchange step 38, as indicated by the arrow 41, and delivered into an evaporation step 42 in which water is evaporated and discharged from the process, as indicated by the arrow 43. Evaporation is preferably carried out under vacuum conditions, for example, at an absolute pressure of 18 to 20 mm. at 25° C. A preferred operation is to concentrate to about $\frac{1}{10}$ to $\frac{1}{15}$ the original volume of the solution and then decolorize with decolorizing charcoal or other decolorizing adsorbent. Such a step is particularly useful when starting with dark-colored phosphatidic material, for example, cotton seed oil phosphatides; but in many cases this step can be omitted while still producing a light-colored final product. The evaporation of water may then be continued to produce a dried product which may be discharged from the process, as indicated by the arrow 44. This dried product has the same utility as the dried product of Fig. 1 but is a purer material and has additional uses in food product.

Instead of continuing the evaporation to dryness, it is possible to effect a fractionation of the water-soluble inositol compounds into alcohol-insoluble and alcohol-soluble portions by adding a lower aliphatic alcohol to the concentrated aqueous solution of the water-soluble inositol compounds. Thus the concentrated aqueous solution from the evaporation step 42 of Fig. 2 either with or without treatment with a decolorizing earth may be delivered, as indicated by the arrow 46 of Fig. 3, into a precipitation step 47. An alcohol such as methanol, i. e., any lower aliphatic monohydric alcohol containing not more than five carbon atoms may be added, as indicated by the arrow 48. The inositol compounds insoluble in alcohol are thereby precipitated and may be separated from the solubles in any desired manner such as by filtration. The insolubles are preferably washed several times with alcohol and then delivered, as indicated by the arrow 49 into an evaporation step 51 wherein residual alcohol is evaporated therefrom as indicated by the arrow 52. The resulting product will ordinarily be a white powder and may be discharged from the process as indicated by the arrow 53. This product is a mixture of purified inositol compounds the exact composition of which is not known. They are complexes of nitrogen-inositol, phosphoric acid and carbohydrate in which the nitrogen is mostly amino nitrogen.

The material is a rich source of water-soluble, physiologically active inositol and organic phosphorus, which is free of heavy metal and other metal ions. In isotonic solutions it may be injected into the veins. It forms water-soluble compounds with iron, cobalt and manganese. These compounds are active sources of readily assimilable iron, cobalt and manganese and are particularly suitable for incorporation into milk and other foodstuffs and also animal feeds and food concentrates. These trace elements are recognized as being essential to the proper functioning of liver and to the production of hemoglobin.

On the other hand, most of the inositol in foodstuffs, whether from animal or vegetable sources, is bound and is insoluble. That is to say, it occurs as phytins, which are water-insoluble. Any soluble inositol compounds which are present in the usual foodstuffs are present as sodium or potassium phytates, which form extremely insoluble phytates with iron, for example. On the other hand, the inositol compounds of the present invention are water-soluble and form a soluble salt with iron. This means that any soluble iron in the foodstuffs to which the inositol compounds of the present invention are added is assimilated in the presence of such compounds.

The alcohol-solubles discharged from the precipitation step 47, as indicated by the arrow 54, may also be delivered into an evaporation step 56 in which alcohol and water are evaporated from the solution and discharged from the process as indicated by the arrow 57. The dried alcohol-soluble inositol compounds may be discharged from the process as indicated by the arrow 58.

Both the alcohol-soluble and alcohol-insoluble fractions of the inositol compounds are uesful for the same purposes as the mixture of compounds recovered from the extraction and evaporation steps 21 and 34. The amount and nature of the water-soluble inositol compounds and fractions thereof, however, vary with the source of the vegetable oil phosphatides. For example, starting with 100 parts by weight of each of oil-free corn oil phosphatides and oil-free soyabean oil phosphatides, the insolubles from the alcohol-caustic alkali treatment step 16 will be about 20 parts by weight for each starting material. However, the water-extraction step 21 will yield about 11 parts by weight water-soluble inositol compounds in the case of corn oil phosphatides and about 18 parts by weight in the case of soyabean oil phosphatides. Of the 11 parts by weight of water-soluble inositol compounds from corn oil phosphatides, about 2.5 parts by weight will be methyl alcohol-insoluble and of the 18 parts by weight of water-soluble inositol compounds from soyabean oil only about 0.2 part by weight will be methyl alcohol-insoluble. The methyl alcohol-insoluble fraction from corn oil phosphatides also contains a greater percentage of nitrogen and phosphorus than that from soyabean oil, for example, 0.93% nitrogen and 4.17% phosphorus for corn oil phosphorus as compared to 0.33% nitrogen and 2.0% phosphorus for soyabean oil phosphatides. However, the alcohol-insoluble, water-soluble inositol compounds from both types of phosphatides give a positive anthrone test for sugars, a positive Scherer test for inositol, a positive ninhydrin test for amine, and a negative Fehling test for reducing sugars.

As a specific example of carrying out the present invention, 567 parts by weight of oil-free corn oil phosphatides, 567 parts by weight of potassium hydroxide, and an amount of methanol approximately equal to six times the volume of the phosphatides were refluxed for 8 hours. The mixture was filtered hot and the precipitate washed five times with approximately 1 volume of methanol based on the original volume of the phosphatides. The washed precipitate was dried in a vacuum oven at 25° C., and a yield of 147 parts by weight of a fine, very light yellow powder was obtained.

10 parts by weight of the light yellow powder, which contains the sterol glycosides and inositol compounds, were mixed with 200 parts by weight of water in a high-speed stirring device for 15 minutes. The mixture was filtered and the residue washed three times with 75 parts by weight of water. The washed residue was dried in vacuo at 25° C. and then extracted with 5 volumes of pyridine based on the volume of the light yellow powder and the residue washed several times with approximately 1 volume of pyridine. The insolubles were discarded and the combined extracts and washings were distilled in vacuo at approximately 25° C. to remove the pyridine. A fine white powder, which is substantially pure sterol glycosides, was obtained.

The aqueous solution containing solubles from the water extraction step was percolated through a column of cation exchange resin, which was a commercial product known as Amberlite 120 H. The column was washed several times with water and the washings combined with the percolate. The solution before going through the column was alkaline (pH 10 to 11) and after passing through the column was acid (pH 2 to 3). The percolate was concentrated in vacuo (18 to 20 mm.) at 25° C. to about 25 parts by weight. To this concentrate, 80 parts by weight of methanol were added, and the mixture, after being allowed to set overnight, was titrated and filtered. The precipitate was thoroughly washed with methanol and dried in vacuo. There was obtained 1.4 parts by weight of a white powder that assayed 23.0% inositol, 4.17% phosphorus and 0.93% nitrogen. The powder was soluble in water and in a concentration of 4% in water showed an optical rotation of $$[\alpha]_D^{25° C.} \text{ of } +50$$

In general, 100 parts by weight of oil-free corn oil phosphatides will yield about 20 to 25 parts of light yellow powder as the insolubles containing sterol glycosides and water-soluble inositol compounds from the separation step 13. Extraction with water in the extraction step 17 will yield about 10 to 12.5 parts insolubles containing the sterol glycosides and about 10 to 12.5 parts of solubles containing the inositol compounds. Extraction of the insolubles with pyridine and distilling off the pyridine from the solubles in steps 21 and 24 will yield about 5 to 6.25 parts sterol glycosides. Treatment of the solubles from the extraction step 17 with cation exchange resin, followed by evaporation of water and extraction of the residue with methanol and drying in steps 29, 33, 36 and 42 will yield about 2.5 to 3.5 parts methanol-insoluble, water-soluble inositol compounds.

Although the process described above is the preferred process of preparing the inositol compounds of the present invention, it is apparent that the initial steps disclosed in our copending application referred to above may be employed. Thus the initial step may be treatment of the vegetable oil phosphatides or preferably the oil-free, alcohol-insoluble portion thereof with a mixture of alcohol, potassium hydroxide and pyridine at room temperature followed by a filtration or other separation step. The solubles contain the sterol glycosides. The insolubles from such separation may then be treated with alcohol and the solubles discarded to leave a residue which contains the inositol compounds. This residue may be freed of alcohol, for example, by distillation, and then extracted with water to form an aqueous solution of water-soluble inositol compounds which may be dried to provide a valuable product or which is suitable for passing through the cation exchange step and subsequent steps of the present application. Also, it is possible to immediately subject the insolubles from the separation step 13 of the present application to an extraction with pyridine or other volatile nitrogenous organic base, in which case the insolubles include the inositol compounds, the solubles being the sterol glycosides. After being separated from the pyridine solution containing the solubles, the insolubles may have remaining pyridine removed therefrom, for example, by distillation, and the residue extracted with water to form an aqueous solution of water-soluble inositol compounds. It will be noted, however, that the process of the present invention is much simpler than either of the modifications just discussed and that the pyridine treatment is upon a much smaller volume of materials.

While methyl alcohol is the preferred alcohol employed in all of the various steps following any initial fractionation of phosphatides into alcohol-soluble and alcohol-insoluble phosphatides, any of the normal lower aliphatic monohydric alcohols having not more than five carbon atoms may be employed throughout the process. Thus the reflux temperature in the phosphatide splitting step of Fig. 2 may range from approximately 64° to 150° C. Also, pyridine has been referred to as the solvent for sterol glycosides in which impurities are insoluble but it is entirely possible to employ other vaporizable organic nitrogenous bases including the aliphatic amines such as tertiary amines, for example, triethylamine and also picolines, lutidines and certain tar base fractions which will dissolve sterol glycosides. Furthermore, potassium hydroxide has been referred to as the caustic alkali employed, but again, it is possible to substitute other alkali metal hydroxides such as sodium hydroxide. Also any of the inositol-rich fractions such as those from any of the evaporation steps 34, 42, 51 and 56 are excellent sources of inositol. That is to say, any of them may be subjected to acid-splitting and inositol-recovery steps of the type disclosed in our copending application Serial No. 192,232 referred to above.

The nature of the sterol glycosides recovered will depend upon the original source of the phosphatidic material. Thus in the case of corn oil, the sterol components will be largely alpha, beta and gamma sitosterols although some sitostanol and stigmasterol are present and the sugar components will also vary. Other sterol glycosides are recovered from vegetable phosphatides from other vegetable oils.

This application is a continuation-in-part of our copending application Serial No. 192,232, filed October 26, 1950, now Patent 2,691,011, which in turn is a continuation-in-part of our application Serial No. 120,601, filed October 10, 1949, now abandoned.

We claim:

1. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate water soluble inositol compounds, separating insoluble material containing said inositol compounds from materials in solution in said alcohol, and extracting said insoluble material with water to recover water-soluble inositol compounds.

2. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate water soluble inositol compounds, separating insoluble material containing said inositol compounds from materials in solution in said alcohol, extracting said insoluble material with water to recover an aqueous solution containing water soluble inositol compounds, and subjectting said aqueous solution to cation exchange treatment with a cation exchange resin to remove metal cations therefrom.

3. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate water soluble inositol compounds, separating insoluble material containing said inositol compounds from materials in solution in said alcohol, extracting said insoluble material with water to separate an aqueous solution containing water-soluble inositol compounds, subjecting said aqueous solution to cation exchange treatment with a cation exchange resin to remove metal cations therefrom, evaporating water from the resulting solution and treating the remaining material with a lower aliphatic alcohol containing not more than 5 carbon atoms to recover purified water-soluble inositol compounds insoluble in said alcohol.

4. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate sterol glycosides and water-soluble inositol compounds, separating insoluble material containing said sterol glycosides and inositol compounds from materials in solution in said alcohol, extracting said insoluble material with water to separate an aqueous solution containing water-soluble inositol compounds from an insoluble material containing said sterol glycosides, subjecting said aqueous solution to cation exchange treatment with a cation exchange resin to remove metal cations therefrom, evaporating water from the resulting solution and treating the remaining material with a lower aliphatic alcohol containing not more than 5 carbon atoms to recover purified water-soluble inositol compounds insoluble in said alcohol.

5. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate sterol glycosides and water-soluble inositol compounds, separating insoluble material containing said sterol glycosides and inositol compounds from materials in solution in said alcohol, extracting said insoluble material with water to separate an aqueous solution containing water-soluble inositol compounds from an insoluble material containing said sterol glycosides, subjecting said aqueous solution to cation exchange treatment with a cation exchange resin to remove metal cations therefrom, evaporating water from the resulting solution to produce a concentrated solution, adding a lower aliphatic alcohol containing not more than 5 carbon atoms to said concentrated solution to precipitate water-soluble inositol compounds, and separating the precipitated inositol compounds from the remaining concentrated solution to recover purified water-soluble inositol compounds.

6. The process of recovering water-soluble inositol compounds from vegetable oil phosphatidic material containing bound inositol and sterol glycosides, which comprises, treating said material with a solution consisting essentially of a caustic alkali in a lower aliphatic alcohol containing not more than 5 carbon atoms to liberate sterol glycosides and water-soluble inositol compounds, separating insoluble material containing said sterol glycosides and inositol compounds from material in solution in said alcohol, extracting said insoluble material with water to separate an aqueous solution containing said inositol compounds from an insoluble material containing said sterol glycosides, subjecting said aqueous solution to cation exchange treatment with a cation exchange resin to remove metal cations therefrom, evaporating water from the resulting solution to produce a concentrated solution, decolorizing said concentrated solution with a decolorizing adsorbent, adding a lower aliphatic alcohol containing not more than 5 carbon atoms to the decolorized solution to precipitate inositol compounds, and separating the precipitated inositol compounds from the remaining decolorized solution to recover purified water-soluble inositol compounds.

7. The process of recovering water-soluble inositol compounds substantially free of metal cations from vegetable oil phosphatidic material containing bound inositol and sterol glycosides, which comprises, treating said material with a solution consisting essentially of a caustic alkali in methanol to liberate sterol glycosides and water-soluble inositol compounds, separating insoluble material containing said sterol glycosides and inositol compounds from material in solution in said methanol, extracting said insoluble material with water to separate an aqueous solution containing said inositol compounds from an insoluble material containing said sterol glycosides, subjecting said aqueous solution to cation exchange treatment with a cation exchange resin to remove metal cations therefrom, evaporating water from the resulting solution and treating the remaining material with methanol to recover purified water-soluble inositol compounds insoluble in methanol.

8. The water-soluble inositol compounds formed by the process defined in claim 1.

References Cited in the file of this patent

UNITED STATES PATENTS

| | | |
|---|---|---|
| 2,306,547 | Langlois | Dec. 29, 1942 |
| 2,415,301 | Mattikow | Feb. 4, 1947 |
| 2,415,313 | Thurman | Feb. 4, 1947 |
| 2,494,726 | Lyons et al. | Jan. 17, 1950 |

OTHER REFERENCES

Woolley: J. Biol. Chem., 147, 582, 585 (1943).
De Suto-Nagy et al.: Ibid., 171, 750 (1947).
Scholfield et al.: J. Am. Oil Chemists' Soc., 25, 368, 371 (1948).
Folch: Ibid., 177, 499 (1949).
Wittcoff: "The Phosphatides," Reinhold Publishing Corp., 1951, pages 35–6.

Dedication 2,746,957.—*David Perlman* and *Morris Mattikow*, New York, N.Y. RECOVERY OF WATER SOLUBLE INOSITOL COMPOUNDS AND STEROL GLYCOSIDES. Patent dated May 22, 1956. Dedication filed June 30, 1964, by the assignee, *Benjamin Clayton, doing business as Refining, Unincorporated.*

Hereby dedicates to the public the terminal part of the term of said patent effective December 31, 1963.

[*Official Gazette September 29, 1964.*]